United States Patent
Capron et al.

(10) Patent No.: US 7,638,757 B2
(45) Date of Patent: Dec. 29, 2009

(54) METHOD FOR OPTICALLY DETECTING AND IDENTIFYING A THREAT

(75) Inventors: Barbara A. Capron, Sammamish, WA (US); Philip E. Cassady, Snoqualmie, WA (US); Dennis G. Koshinz, Bellevue, WA (US); Jonathan Saint Clair, Seattle, WA (US); William D. Sherman, Renton, WA (US); Fong Shi, Bellevue, WA (US); Minas H. Tanielian, Bellevue, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/198,718

(22) Filed: Aug. 26, 2008

(65) Prior Publication Data

US 2008/0315075 A1    Dec. 25, 2008

Related U.S. Application Data

(62) Division of application No. 11/164,414, filed on Nov. 22, 2005, now Pat. No. 7,432,498.

(51) Int. Cl.
*G02B 26/08* (2006.01)
(52) U.S. Cl. .................. 250/234; 250/216; 359/291; 359/298
(58) Field of Classification Search .......... 250/234, 250/216, 330, 332, 334, 337; 359/290–292, 359/298
See application file for complete search history.

(56) References Cited

U.S. PATENT DOCUMENTS

| | | | |
|---|---|---|---|
| 5,519,206 A * | 5/1996 | Uwira | 250/208.1 |
| 6,016,220 A * | 1/2000 | Cook | 359/351 |
| 6,643,007 B2 * | 11/2003 | Le | 356/237.3 |
| 6,876,483 B1 | 4/2005 | Svec et al. | |
| 2002/0088942 A1 | 7/2002 | Metcalf et al. | |
| 2006/0018651 A1 | 1/2006 | Cho et al. | |

OTHER PUBLICATIONS

S.P. Carfagno, "Spectral Characteristics of Muzzle Flash," AMCP-706-255, U.S. Army Material Command, AD-818 532, Jun. 1967.
David B. Law et al., "Multispectral Signature Analysis Measurements of Selected Sniper Rifles and Small Arms," SPIE Proceedings, vol. 2938, pp. 288-298, 1997.

* cited by examiner

*Primary Examiner*—Kevin Pyo
(74) *Attorney, Agent, or Firm*—Ostrager Chong Flaherty & Broitman P.C.

(57) ABSTRACT

An optical detection apparatus includes a housing having a circumferential opening therein. A primary mirror reflects light rays to form a first set of light rays to a secondary mirror that has a generally concave shape coupled to the housing. A tertiary mirror having a generally concave shape coupled to the housing spaced apart from the secondary mirror directs light to detection optics that form an image using the third set of light rays. The detection optics include a micro-mirror array that redirect the image to a detector. A controller controls the micro-mirror array and determines an event characteristic based upon the image thereon.

16 Claims, 5 Drawing Sheets

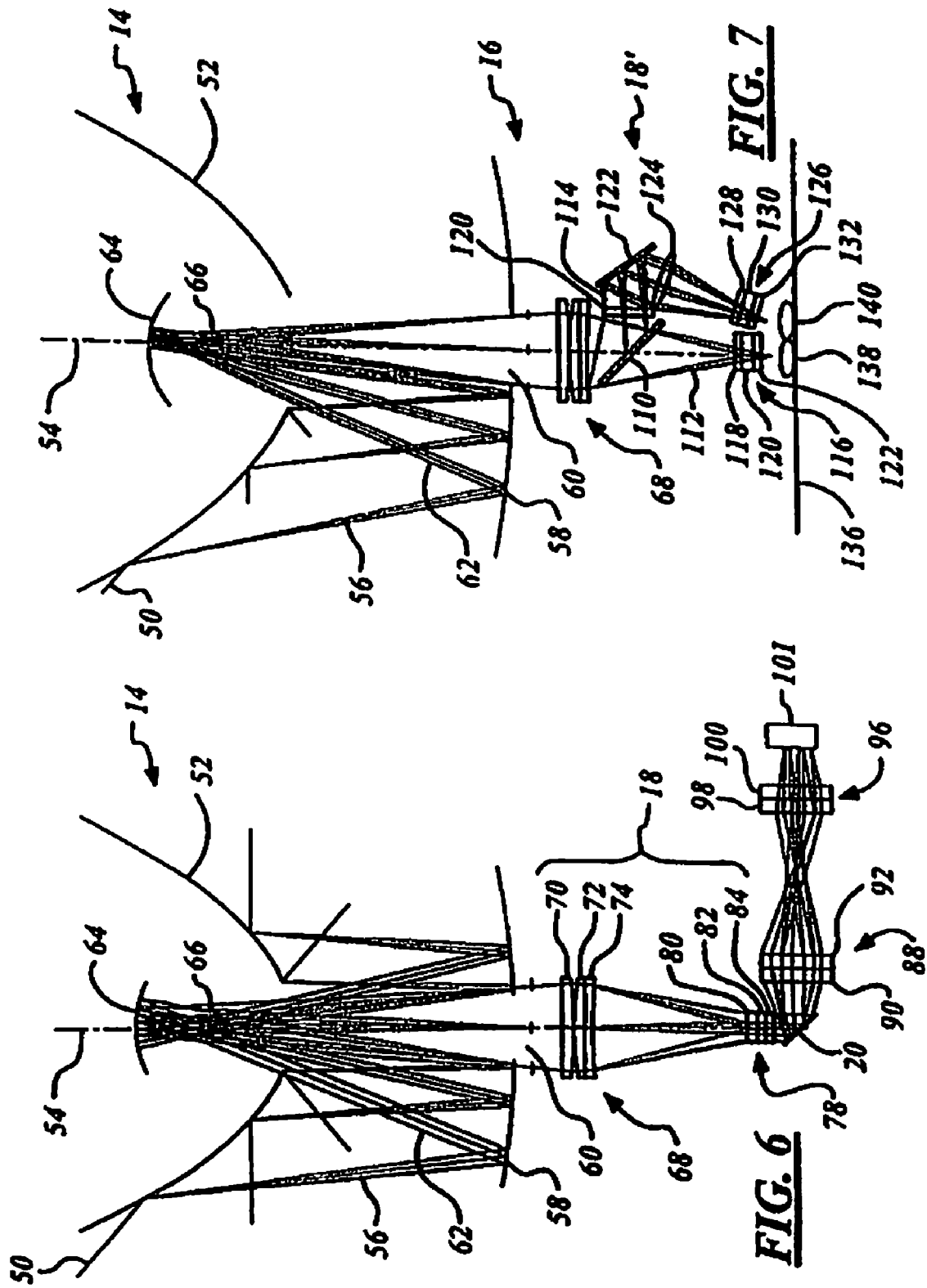

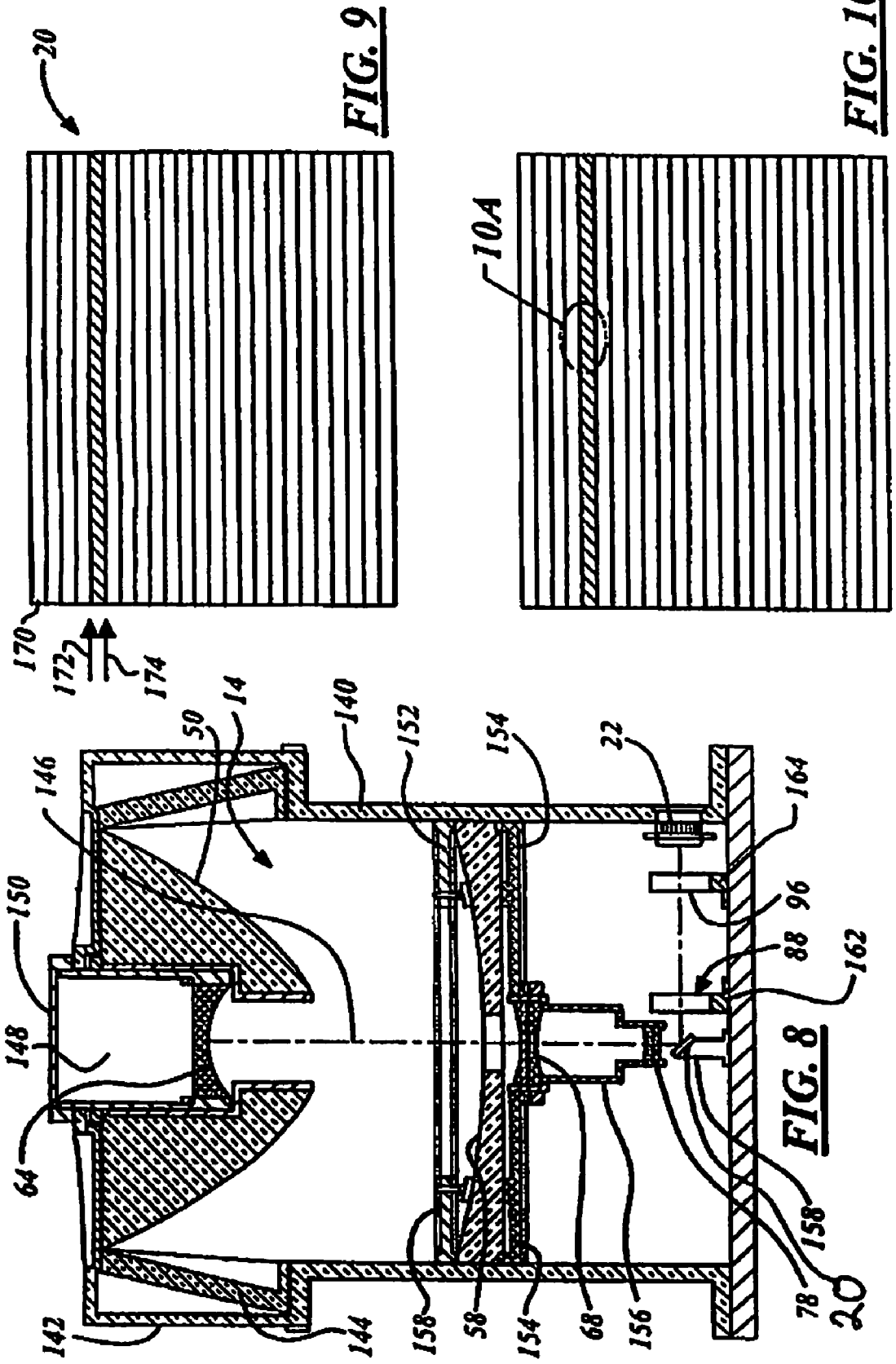

METHOD FOR OPTICALLY DETECTING AND IDENTIFYING A THREAT

CROSS REFERENCE TO RELATED APPLICATION

The present application is a divisional of U.S. application Ser. No. 11/164,414, filed Nov. 22, 2005, which is incorporated herein by reference.

TECHNICAL FIELD

The present invention relates generally to threat detection systems, and more particularly to a threat detection system for optically detecting threats such as a combustive or explosive event.

BACKGROUND

In various situations it is desirable to identify a munitions threat such as sniper fire, rocket propelled grenades (RPGs), mortars, and man-portable air defense systems (MANPADs). Such detection systems may be used so that countermeasures may be deployed. In warfare identification may include a location so that troops may be deployed to counter the threat.

Various systems have been used to detect threats. Such systems include optical and acoustic-type systems. Acoustic techniques are generally low cost. Such systems are typically effective at only a short range. Optical techniques tend to be much faster and have a longer range but at a higher cost. For threats that are several hundred meters away, optical systems are required.

Current optical detection systems use focal plane arrays (FPA) that scan at a frame rate of 30 to 60 Hz. This frame rate corresponds to between 16 and 33 milliseconds. Such a time period, however, is not fast enough for detection of transient signals such as sniper fire, which is believed to have a duration of about 2 milliseconds. Therefore, tradeoffs may need to be made in that the detection time window needs to be shortened to improve the signal-to-noise ratio. Shortening the time window may allow events to be missed. A long time window, or a long integration time may be chosen but may reduce the probability of detection because of increased clutter. Therefore, a balance must be chosen to detect particularly short duration events. Sniper detection has the shortest duration and the weakest signal of the four above-mentioned threats.

Therefore, it would be desirable to provide an optical detection system that responds to relatively quick threats such as sniper fire as well as identifying other types of threats with a reasonable cost device.

SUMMARY

The present invention provides a relatively low cost method for detecting various types of threats in a rapid manner.

In one aspect of the invention, a detection apparatus includes a housing having a circumferential opening therein and a primary mirror reflecting light rays to form a first set of light rays. A secondary mirror having a generally concave shape is coupled to the housing. A tertiary mirror having a generally concave shape is coupled to the housing spaced apart from the secondary mirror and the primary mirror. The secondary mirror receives the first set of light rays and reflecting the first set of light rays to form a second set of light rays. The secondary mirror directs the second set of light rays to the tertiary mirror. The tertiary mirror reflects the second set of light rays to form a third set of light rays. The apparatus further includes detection optics that receive the third set of light rays and direct the third set of light rays to a detector.

In a further aspect of the invention, a method of optically characterizing an event comprises receiving light rays from the event, directing the light rays to form an image on the micro-mirror device, controlling the micro-mirror device in groups, controlling the micro-mirror device to sequentially reflect the light rays from the groups to a detector, generating a detector signal in response to a reflected image, determining an event characteristic in response to the detector signal, and controlling a display in response to the event characteristic.

One advantage of the invention is that the system is relatively low cost and provides rapid detection of various threats so that quick threats such as sniper fire may be determined and detected.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 6 is a cross-sectional plan view of the optics of one embodiment of the present invention.

FIG. 7 is a plan view of a second embodiment of the optics of the present

FIG. 8 is a detailed view of the optics of FIG. 6 in a housing.

FIG. 9 is an elevational view of a micro-mirror array group.

DETAILED DESCRIPTION OF THE PREFERRED EMBODIMENT

Figure 1:
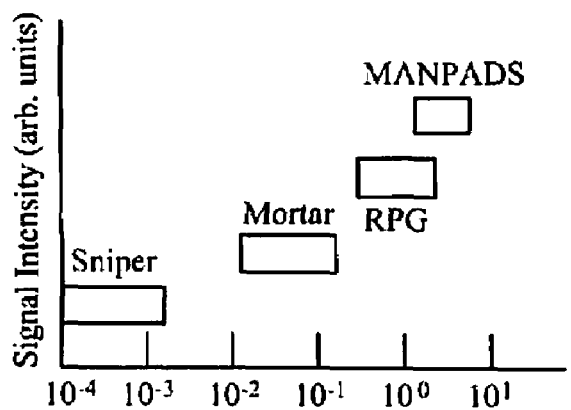
FIG. 1 is a plot of signal intensity versus signal time duration/persistence of various temporal signatures of threats.

In the following figures the same reference numerals will be used to illustrate the same components.

The present invention is also set forth with respect to specific threats such as explosive threats of sniper fire, mortar fire, rocket propelled grenades, and shoulder-fired missiles (MANPADs). The present invention is also suitable for other types of optical detection and is suitable for various wavelengths.

As will be described below, the sensing system monitors 360 degrees of azimuth, 60 degrees of elevation, and 20 degrees of depression in a field of view for the presence of a threat. The various types of threats such as sniper fire, mortar fire, rocket propelled grenades, and MANPADs have different spectral contents. However, it has been found that two spectral bands, one centered at 2.8 pm and one at 4.5 pm are common to all. These spectral bands are mid-infrared range bands that are believed to be due to CO, emissions, and to a lesser extent, H2O. Various other types of spectral lines may be present depending on the specific threat considered. Therefore, the mid-IR range was chosen to concentrate the detection for a combustion or explosive event. As will be described below, the range of 1 to 5 pm was chosen for a baseline approach, whereas the 2.5 pm and 4.5 pm were used in an enhanced version.

Referring now to FIG. 1, a signal time duration persistence shows the intensity in arbitrary units of various types of threats such as sniper, mortar, RPG, and MANPADs. The present invention seeks to identify and classify the different types of threats based on the characteristics of the signature.

Figure 2:
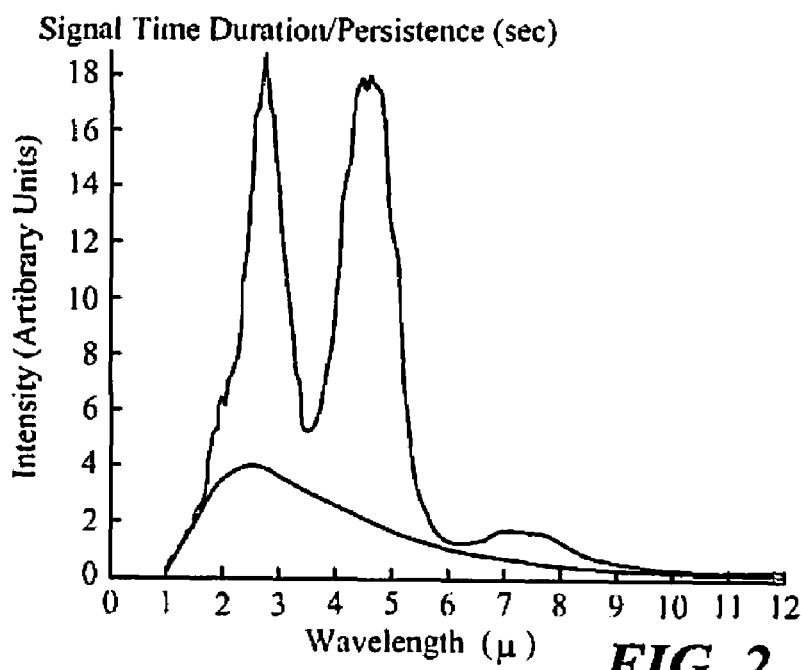
FIG. 2 is a plot of intensity versus wavelength of a muzzle flash.

Referring now to FIG. 2, a spectral plot of wavelength versus intensity of a muzzle flash is illustrated, which is superimposed on a spectral signature of a grey body curve for an object at 1135° K. The visible signal when plotted on the same graph gives rise to a small tail in the left side of the curve. Most of the intensity of the muzzle flash is due to the secondary flash. The signal at about 2.8 pm and 4.5 pm is due to the excited CO, and H2O bands and to a lesser extent, ammonia and OH radicals. Contaminants in the gunpowder and bullet casings can alter the overall signature to a certain extent. However, the presence of CO, and H2O emission bands are universal attributes of any combustion process and thus qualify for a good marker for all of the types of threats mentioned above in FIG. 1

Figure 3:
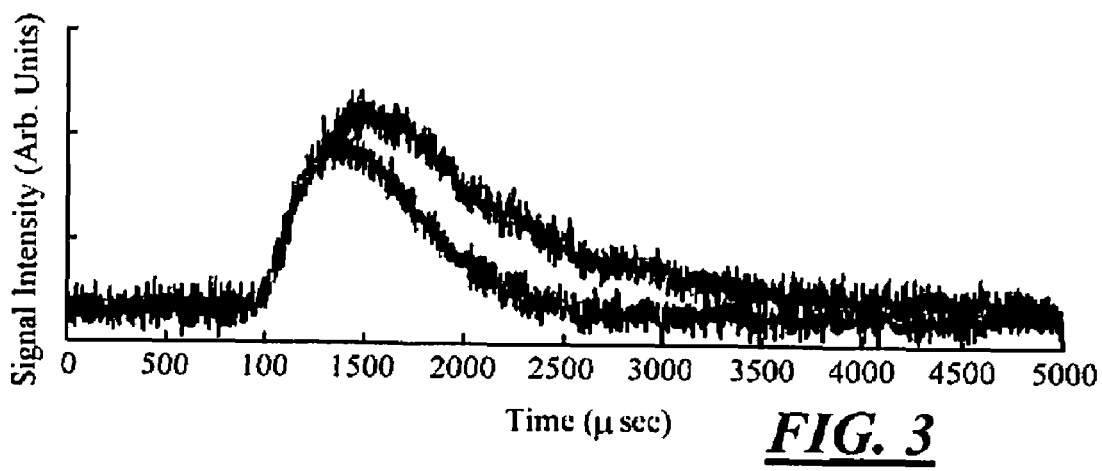
FIG. 3 is a plot of intensity versus time of a muzzle flash at two different signal ranges.

Referring now to FIG. 3, a temporal signature of two infrared bands of interest are illustrated. The data uses a .308 caliber rifle. The higher energy band decays faster than the lower energy band. This is expected since the energy available to excite the higher energy lines is lower as the gas is cooled after the explosion. Although the rise-time tends to change with the type of rifle and ammunition used, the signal fall-time or decay shape is generally governed by gas dynamics and is thus, generally universal.

Figure 4:
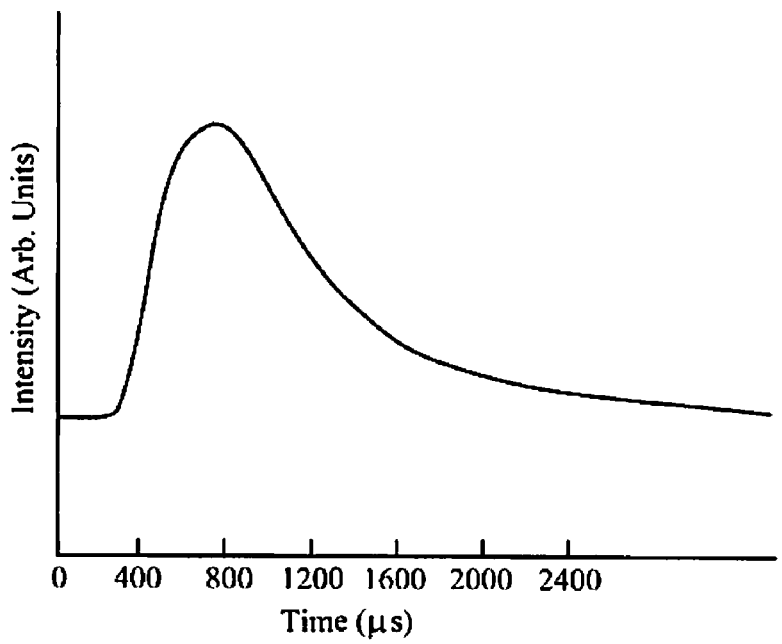
FIG. 4 is a plot of a muzzle flash of a .308 caliber weapon as a function of time.

Referring now to FIG. 4, integrated intensity of a muzzle flash in the range of 1.5 to 10 pm is set forth as a function of time. The data in FIG. 4 was obtained using a HgCdTe detector. Each square corresponds to 400 μsec. As mentioned above, the rise-time is characteristic of the weapon involved, whereas the fall-time is generally governed by gas dynamics. RPGs and MANPADs have a secondary signature that are similar due to the rocket plume. Such plumes are easy to detect because their persistence times are much longer than the characteristic times of a muzzle flash. Thus, a system that can detect a muzzle flash in real time can effectively determine other types of threats.

Figure 5:
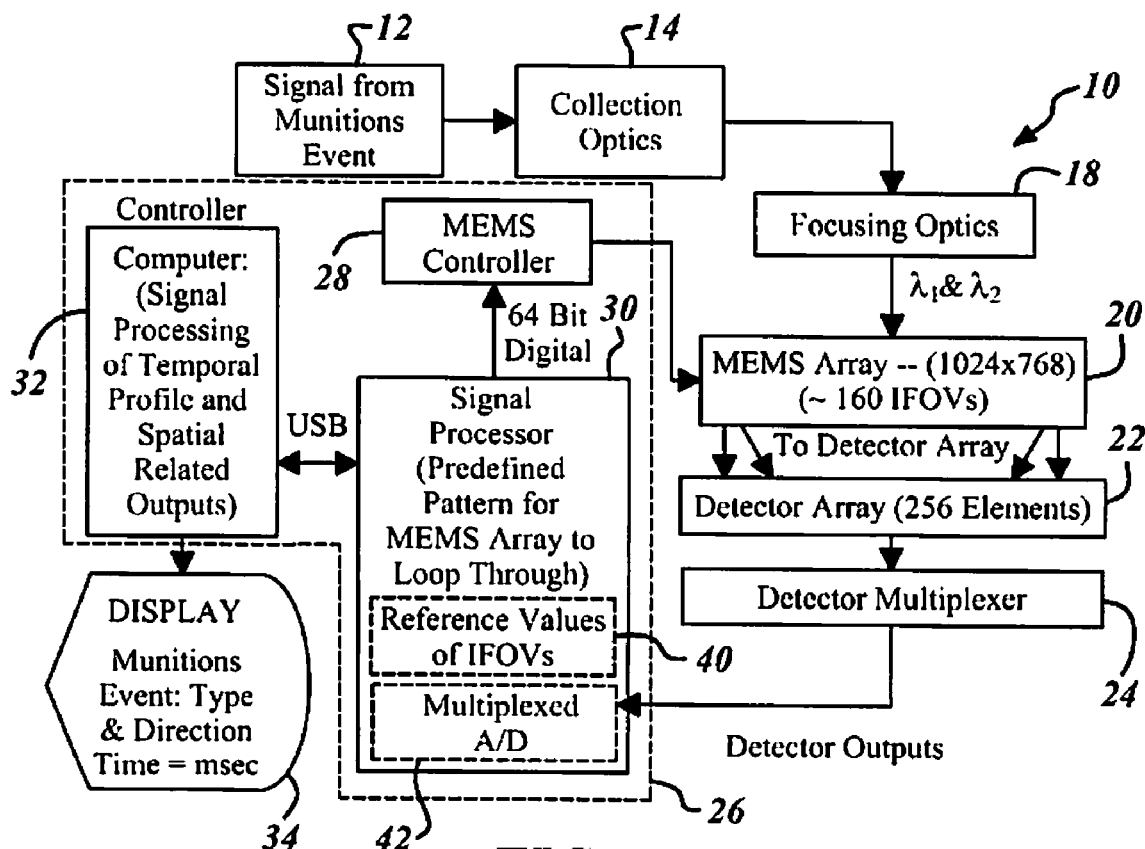
FIG. 5 is a block diagrammatic view of the optical detection apparatus according to the present invention.

Referring now to FIG. 5, a detection system 10 is illustrated in block diagrammatic form. The detection system 10 receives a signal from a munitions event represented by box 12. The munitions event 12 is an unidentified munitions event from various types of munitions as described above. The system further includes collection optics 14 that are used to collect the signal from a 360° horizontal by 80° vertical field of view. Of course, the field of view may depend on the specific system parameters. Thus, the field of view may be varied. The collection optics 14 will be further described below. The collection optics 14 sends the light to the focusing optics 18. Two wavelength signals may be provided from the focusing optics by breaking the signal down into two wavelength components as mentioned above, corresponding to the 2.8 pm wavelength and the 4.5 pm wavelength. Of course, other types of wavelengths and a single wavelength may be used.

The focusing optics 18 image the light rays on a MEMS array 20. The MEMS array 20 may, for example, be a micro-mirror array such as a Texas Instruments micro-mirror device. One such device has 1024 by 768 pixels and is roughly 3.5 pm size. The MEMS array couples the light to a detector array 22. One possible detector array is a 1 by 256 linear PbSe detector array that may be interrogated in 64 μsec. The micro-mirror MEMS array 20 has the capability of projecting the field of view image, a given set of pixel rows at a time, onto the linear detector array 22. The signals in the detector array 22 are read out at one time and provided to a comparator to determine if they exceed the threshold level set up to be above the background noise margin. By successive projection of sets of rows, the whole field of view image will be scanned onto the detector array. By using this process, the signal location within a 2.5° by 2.5° instantaneous field of view (IFOV) may be determined. The signals pass through a detector/multiplexer 24 on the way to a MEMS controller 26. The controller 26 may include various controllers such as a MEMS controller 28, a signal processor for predefined patterns of MEMS arrays through the loop 30, and a computer that processes the temporal and spatial related outputs of the system in block 32.

A display 34 is coupled to the computer 32. The computer 32 controls a display 34 as will be further described below. The display 34 may convey information such as the munitions type of event and direction including azimuth information and elevation information.

The signal processor 30 may include reference values for an initial field of view represented by box 40 and a multiplex analog-to-digital converter represented by box 42. A multiplex analog-to-digital converter may be coupled to the demultiplexer 24 for receiving the signals from the detector. The analog signals from the multiplexer 24 are converted into digital signals 42 for further processing within the signal processor 30.

Referring now to FIG. 6, the collection optics 14, focusing optics 18, and detector 20 are illustrated in a cross-sectional plan view. Light rays 50 enter the system through a window that will be described below. The light rays 50 are incident upon a primary mirror 52. Primary mirror 52 generally has a paraboloid shape having an axis about the centerline 54. That is, the cross-sectional view of the primary mirror 52 is a parabola rotated about the centerline 54 to form the paraboloid shape. Light rays 50 may be reflected all around the paraboloid shape 52 in the 360° field of view. The 360° field of view is the lateral field of view relative to the centerline. The device also has an 80° field of view in the vertical direction, which in FIG. 6 is the up and down or axial direction.

The light rays 50 reflected from the primary mirror 52 form a second set of light rays 56 that are directed toward the secondary mirror 58. The secondary mirror 58 is generally concave and aspheric. The secondary mirror 58 has an opening 60 therein. A third set of light rays 62 are reflected from the secondary mirror 58 toward the tertiary mirror 64. The tertiary mirror 64 is also aspheric in shape and concave. Both the secondary mirror 58 and the tertiary mirror 64 are centered about the centerline or center axis 54. The tertiary mirror 64 provides a fourth set of light rays 66 that are directed toward the focusing optics 18. The fourth set of light rays are directed through the opening 60. It should be noted that the beam of light rays 66 reflected from the tertiary mirror 64 have a generally donut shape due to the reflection from the secondary mirror 58. The mirrors 52, 58, 64 and the lenses in the focusing optics 18 form a catadioptric system. The mirrors are wavelength insensitive and can be inexpensively shaped by electro-forming.

One embodiment of the focusing optics, 18 is illustrated in FIG. 6. In this embodiment, the focusing optics 18 consists of two triplet lenses, 68 and 78. The first triplet lens 68 includes a first lens 70, a second lens 72 and a third lens 74. The first lens, 70 is a meniscus silicon lens with spherical surfaces. The second lens 72 is a piano-convex silicon lens with a spherical surface. The third lens 74 is a germanium biconcave lens with spherical surfaces. The second triplet, 78 contains three lenses, 80 82 and 84. The first lens 78 is a germanium plane parallel plate. The second lens, 82 is a silicon meniscus with spherical surfaces. The third lens, 84 is germanium meniscus with spherical surfaces.

The focusing optics 18 also include a second group of lenses 78. The second group of lenses 78 includes a first lens 80, a second lens 82, and a third lens 84. The micro-mirror array 20 receives the light rays focused thereon from the second group of lenses 78. The array preferably has a number of pixels at about 13.5 pm square. One of the challenges for the optical system includes collecting a sufficient amount of light for the signal-to-noise requirements, focusing the light onto the 13.5 pm pixels, and enhanced design working at two mid-IR wavelengths described above. The mid-IR region was chosen because 99 percent of the signal resides between 2.5 and 5.5 pm. Therefore, the material of the lenses may be formed from silicon, germanium and AMTIR. These materials have larger indices of refraction than standard visible optical materials which results in reduced aberrations. However, since the diffraction scales with wavelength (Airy spot size is –2.4AF where A is the optical wavelength and F if the F number), achieving small spot sizes and better resolution requires small F numbers. In general, small F number systems have large aberrations, but at the longer wavelengths, a given amount of wavefront aberration has less effect. In addition, lower surface quality is required due to the longer wavelengths.

The micro-mirror (MEMS) array 20 has individual micro-mirror pixels that when powered can tilt between two angular settings. One at ±12° and one at 12° with respect to the normal. The 24° swing gives the extremes of the reflected beam a 48° angular difference. This allows for the projection of the focused image onto the MEMS array 20 to be relayed in different direction in a rapid fashion. In other words, the MEMS array 20 can scan an image of an intensity distribution by projecting different portions of the array (and effectively the image projected onto the MEMS array) onto the detector array. This is done by programming ones and zeros for the control of each pixel. Each pixel can be programmed separately and requires 102 μsec to instruct the entire array. The actual execution of the instructions (flipping of the mirrors) requires an additional 12 μsec. If this is done one row of micro-mirror pixels at a time, it will take far too long to process the image in the desired μsec time frame.

The light from the MEMS array 20 is directed to a matched pair of relay lenses (88 and 96) whose function is to relay the image formed at the MEMS array to the detector plane (101). In the embodiment illustrated in FIG. 6, relay lens 88 is a doublet lens consisting of first lens 90, an AMTRI biconvex lens with spherical surfaces and second lens 92 a biconcave germanium lens with spherical surfaces. Relay lens 96 consists of a doublet lens that is identical to lens 88 except it is rotated 180 degrees with respect to the optical axis such that the light hits lens 98, the biconcave germanium lens first and lens 100 the AMTRI biconvex lens next. The light proceeds from lens 100 to the detector 101.

Referring now to FIG. 7, the system may also be used to form two donut-shaped images corresponding to the two wavelengths of interest. That is, in the present example the focusing optics 18' include identical components up to the first set of lenses 68. Therefore, they will not be discussed further. In FIG. 7, a dichroic splitter 110 is used to split the light rays 60 into the two wavelength beams. The first set of light rays corresponds to the 2.8 pm beams 112 and the second set of light rays 114 corresponds to the 4.5 pm beams. The first set of light rays 112 are directed through a first set of lenses 116 that comprise lenses 118, 120 and 122.

The second set of light rays 114 corresponding to the 4.5 pm beams are directed toward a first lens 120, which in turn have the light rays reflected from the mirror 122, which in turn are directed toward a lens 124. The light rays from the lens 124 are directed toward a second group of lenses 126 that include lenses 128, 130 and 132.

Referring now to FIG. 8, a more detailed view of the system of FIG. 6 is illustrated. In this figure, the same reference numerals will be used to identify the same components. The light rays have a similar path and for simplicity the light rays are not illustrated. The collection optics 14, the relay mirrors 16, the focusing optics 18, the MEMS array 20, and the detector array 22 are preferably located within a generally cylindrical housing 140. The housing 140 includes the various supports and the like for supporting the mirrors and the optics. The housing 140 has a window 142 disposed therearound. In the constructed embodiment, six large area inlet optical apertures or windows 142 were used. The windows 142 are transmissive to the mid-IR wavelengths described above.

The housing 140 includes a support spider 142 for supporting the window 144.

The primary mirror 50 includes an opening 146 therein. The light rays reflected from the secondary mirror 148 are received within the opening 146 and reflect from the tertiary mirror 164. The tertiary mirror 164 may be inserted through an opening 148 in the top of the housing 140. A cap 150 may be used to cover the opening 148 after assembly.

Secondary mirror support spiders 152 may be used to support the secondary mirror in position.

Supports 154 may be used to support the first set of lenses 68. Walls 156 extending therefrom may be used to support the second group of lenses 78. A stand 158 may be used to support the MEMS array 20. Also, stands 162, 164 may be used to support the third group of lenses 88 and the fourth group of lenses 96. The first group of lenses 88 and the second group of lenses 96 may be anamorphic. Thus, the lens group 88 and 96 are anamorphic lenses that direct the light rays to the detector 22. The detector 22 may be disposed within the housing 140 or on a housing exterior wall.

Referring now to FIG. 9, a plan view of a surface of a micro-mirror 20 is illustrated. In this illustration, the micro-mirror has 24 line blocks 170. Although 24 line blocks are illustrated, more or less line blocks are possible. Arrow 172 represents the pointer at the beginning of the read cycle and arrow 174 indicates the position of the pointer at the beginning of the next read cycle. The array is addressed in line blocks 170 to increase the speed of the system. As mentioned above, the micro-mirror array has 1024 by 768 pixels. That is, if 24 line blocks are chosen, each line block has a height of 32 pixels. If 16 line blocks are chosen, then each block would consist of 48 pixel rows. The following time block is used for every horizontal block, which represents 1024 columns. The image is projected onto the 256 detector array using the following time budget: about 6 μsec to program the micro-mirrors in the block, about 12 μsec to flip the micro-mirrors, and interval T to collect data in the detector, about 6 μsec to go back and null the horizontal block so that we can project the next array, 6 μsec to move the pointer to the next block of rows. This time budget adds up to about 30+T μsec. One known configuration of a detector provides a 64 μsec scan time. And thus the system is a lot faster than currently known optical detectors. Choosing the dwell time of a scan is important. This may be done experimentally based on the various configurations. Providing too long of a dwell time will result in too long of a cycle time. Too short of a dwell time may generate a very weak signal. However, short dwell times reduce the background clutter. Thus, if the time T is 10 μsec, the total amount of time required for a line block scan is about 40 μsec (30+10). Because the sensor scan rate above is 64 μsec, the limitation is in the sensor array.

To locate an event in a line block or set of pixel rows the signal must be localized in terms of the set of array columns. To achieve this, when a line block is scanned, all the pixels are set at one (pointing in the same direction toward the detector array). This projects the entire image of the line block toward the detector. A set of cylindrical lenses shown above focuses the image from each of the line blocks. The linear detector array may be a thermal-electrically cooled PbSe (lead selenium) 1×256 detector array. One example of such a detector is from Cal Sensors, Inc. The wavelength of the detector array is about 1 to about 5 pm. If 17 line blocks were used to interrogate all the rows in the micro-mirror array 20, the initial field of view is 17×256=352 elements. Considering that the total field of view required to interrogate consists of 365°×80°, which is equivalent to $28800^{2°}$, that means that each initial field of view covers a viewing window that is roughly 2.5° by 2.5°. Since the image corresponding to the system field of view will not cover the entire surface of the micro-mirror array, the effective size of the initial field of view will be smaller. Using 17 line blocks at a scan speed of 64 μsec results in a total scan of the entire field of view of 1.088 msec. If more line blocks such as 24 were used, the entire scan would last 1.536 msec. This is still within the duration of the desired signal. If 24 line line blocks were used, the initial field of view would be reduced to 2.4°×2.4°.

Figure 10A:
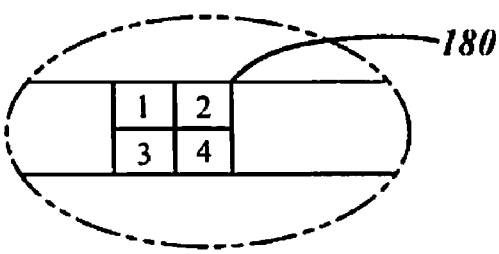
FIG. 10 is an elevational view of a micro-mirror array cluster.

Referring now to FIG. 10, once the detection process indicates a bright spot in the initial field of view compared to the background, a discrimination process may be employed. The background spatial clutter, which is based on the results of the previous scan, is stored in a memory chip. The background intensity values are used by the system as a reference to detect changes from the previous scan. If a signal is detected that is above the previous value, the pointer is reset and a rescan of that linear block is done to see if the signal is changing in real time. In the rescan, the dwell time/integration time may be increased if a larger signal-to-noise ratio is desired. Several rescans may be done. In each case, subtracting the signal from the previously recorded signal may be performed which allows for checking of the temporal signature of the event. Once an event has been recorded the localized position may be determined with higher accuracy. To achieve this, the initial field of view may be broken into smaller segments as is illustrated in FIG. 10. In FIG. 10, a segment 180 is shown with four consecutively numbered sub-segments or quadrants. The signals from the four quadrants are redetected in sequence to the detector array.

By measuring the respective signal in each quadrant and comparing the relative intensity, the origin of the signal may be located with accuracy through the use of centroiding techniques which work particularly well with blurry images. A number of causes may blur the image coming from a muzzle blast, including optical aberrations and temporal clutter. Additional blurring may come from the change in signal intensity as a function of time, as the four quadrants are interrogated. By centroiding, it is believed that 0.5° by 0.5° of accuracy may be used in resolving the location of the target using centroiding. Once an event is determined, the data may be transferred to the computer from the signal processing. The computer may be used to compare the temporal signature of the signal with the different types of threats expected. If it is not possible to conclude what type of threat it is, further incoming signals may be used to form a positive identification.

Figure 11:
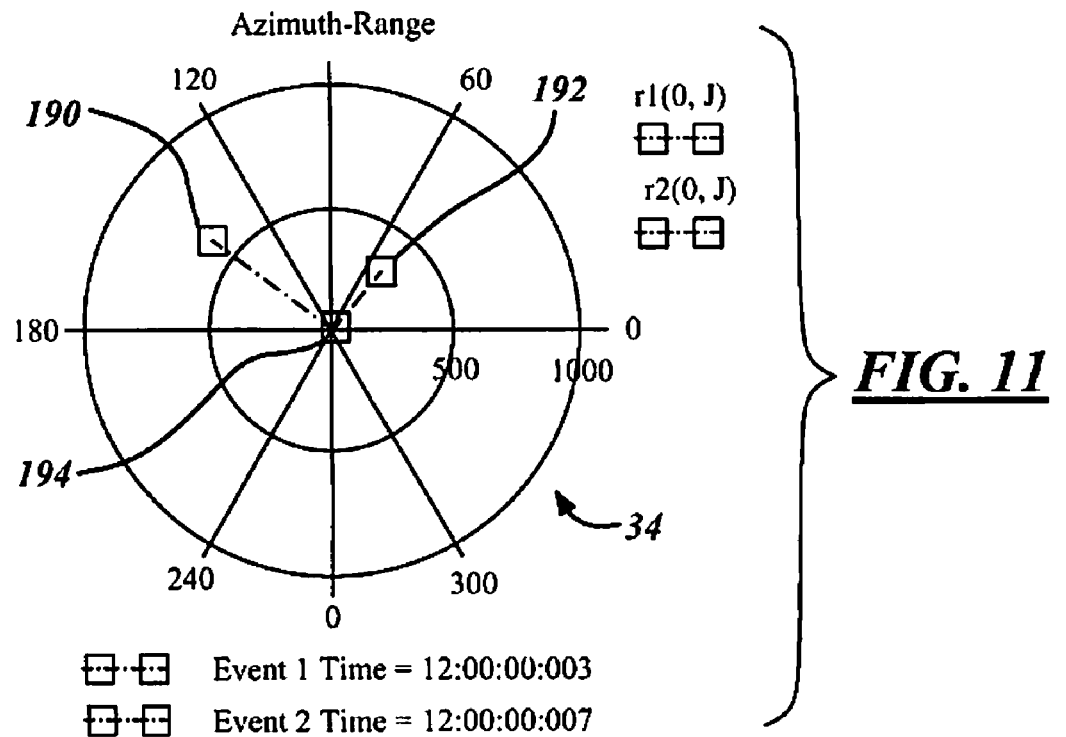
FIG. 11 is an embodiment of a first example of a potential display according to the present invention.

Referring now to FIG. 11, one possible screen display is illustrated with various threats 190, 192 and 194 illustrated thereon. As can be seen, the azimuth and range of the threats may be ascertained by the screen display.

Figure 12:
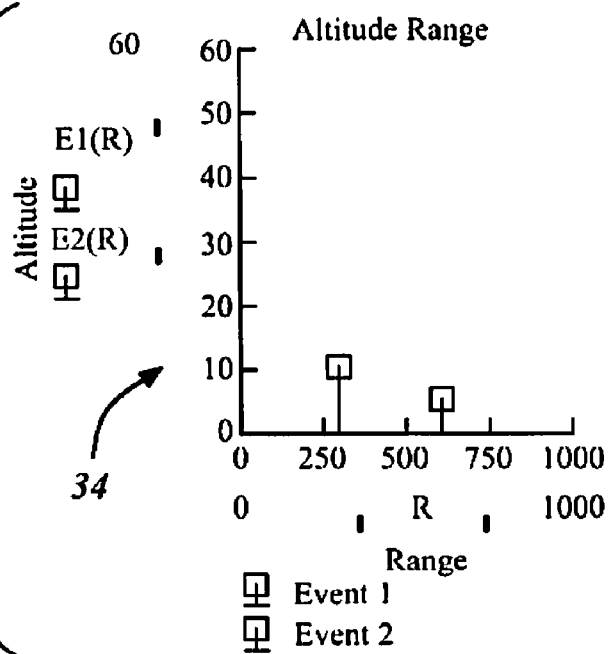
FIG. 12 is a plot of a second embodiment of a display according to the present invention.

Referring now to FIG. 12, a second type of display is illustrated conveying the same information as FIG. 11. Of course, those skilled in the art will recognize that various types of screen displays may be employed depending on the particular need for which the present invention is deployed.

While particular embodiments of the invention have been shown and described, numerous variations and alternate embodiments will occur to those skilled in the art. Accordingly, it is intended that the invention be limited only in terms of the appended claims.

What is claimed is:

1. A method of optically characterizing an event comprising:

receiving light rays from the environment;

directing all of the light rays through a plurality of optics towards a micro-mirror array comprising a plurality of individually directable mirrors arranged in rows;

controlling the micro-mirror array to successively reflect different portions of said light rays onto a detector by projecting different sets of rows of mirrors in the micro-mirror array toward the detector, which converts each portion of light rays to detected electronic data; and comparing said detected electronic data with stored background data, and upon detecting a bright spot in comparison to said stored background data, immediately initiating a rescan of the set of rows in which the bright spot was detected, by sequentially projecting smaller portions of the mirrors within said set of rows towards the detector, to more accurately detect an event.

2. The method of claim 1, wherein determining the event characteristic includes determining an azimuth.

3. The method of claim 1, wherein determining the event characteristic includes determining an altitude.

4. A method as recited in claim 1 wherein determining an event characteristic comprises comparing a previous image with a current image.

5. A method as recited in claim 1 wherein the image is a donut-shaped image.

6. A method as recited in claim 1 wherein directing the light rays to form an image comprises splitting the light rays according to wavelength and forming two images.

7. A method as recited in claim 1 wherein the images are directed to two detectors.

8. A method as recited in claim 1 wherein the light rays from the environment are received from 360 degrees of azimuth, 60 degrees of elevation, and 20 degrees of depression.

9. The method of claim 1, wherein determining the event characteristic includes the step of determining a category of event.

10. A method as recited in claim 9 wherein the step of determining a category of event includes classifying the event as a type of threat based on the characteristics of the image.

11. The method of claim 10 wherein the characteristics of the image include:

signal intensity;

light wavelength;

signal duration;

a plot of signal intensity versus light wavelength; and a plot of signal intensity versus signal duration.

12. A method as recited in claim 1 further comprising the step of conducting subsequent scans in the area of the detected event to more accurately determine the event characteristic.

13. A method as recited in claim 12 wherein conducting subsequent scans in the area of the detected event further includes the step of utilizing smaller sets of rows of mirrors to more accurately determine the location of an event.

14. A method as recited in claim 12 wherein conducting subsequent scans in the area of the detected event further includes the step of utilizing smaller sets of rows of mirrors to more accurately determine a category of event.

15. A method as recited in claim 1 wherein the step of directing all of the light rays through a plurality of optics towards a micro-mirror array comprises:

directing a first set of light rays towards a primary mirror having a paraboloid shaped cross-section rotated about a centerline, to form a second set of light rays;

directing the second set of light rays towards a secondary mirror having a generally concave and aspheric shaped cross-section rotated about the centerline, to form a third set of light rays;

directing the third set of light rays towards a tertiary mirror having a generally concave and aspheric shaped cross-section rotated about the centerline, to form a fourth set of light rays; and directing the fourth set of light rays through focusing optics towards the micro-mirror array.

16. A method as recited in claim 1 further comprising the step of generating display information for a user.

* * * * *